(12) United States Patent
Fihri et al.

(10) Patent No.: US 11,807,739 B2
(45) Date of Patent: Nov. 7, 2023

(54) FIBROUS NANOPARTICLE-FILLED POLY (METHYL METHACRYLATE) COMPOSITES AND METHODS OF FABRICATION

(71) Applicant: SAUDI ARABIAN OIL COMPANY, Dhahran (SA)

(72) Inventors: Aziz Fihri, Paris (FR); Yassine Malajati, Beachwood, OH (US); Enrico Bovero, Dhahran (SA); Mohamed Bouhrara, El Jadida (MA); Abdullatif Jazzar, Khobar (SA); Hussain Tuwailib, Alqatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 415 days.

(21) Appl. No.: 17/180,165

(22) Filed: Feb. 19, 2021

(65) Prior Publication Data

US 2022/0267570 A1    Aug. 25, 2022

(51) Int. Cl.
*C08K 9/06*     (2006.01)
*C08L 33/12*    (2006.01)
(Continued)

(52) U.S. Cl.
CPC ............ *C08K 9/06* (2013.01); *B29C 39/10* (2013.01); *B29C 39/36* (2013.01); *C08F 2/06* (2013.01);
(Continued)

(58) Field of Classification Search
CPC ..... B29K 2033/12; B82Y 30/00; C08F 20/14; C08L 33/12; C08K 9/06; C08K 2201/011;
(Continued)

(56) References Cited

U.S. PATENT DOCUMENTS

| 9,006,345 B2 | 4/2015 | Lancaster et al. |
| 2013/0112618 A1 | 5/2013 | Diallo et al. |

(Continued)

FOREIGN PATENT DOCUMENTS

| CN | 103730531 A | 4/2014 |
| WO | 2013/018378 A1 | 2/2013 |

OTHER PUBLICATIONS

Marketsandmarkets, "Polymethyl Methacrylate (PMMA) Market worth 5.56 Billion USD by 2021"; Market Research Report; Aug. 1, 2016; <https://www.marketsandmarkets.com/PressReleases/polymethyl-methacrylate.asp>; Accessed Feb. 13, 2020 (6 pages).
(Continued)

*Primary Examiner* — Kregg T Brooks
*Assistant Examiner* — David R. Foss
(74) *Attorney, Agent, or Firm* — Osha Bergman Watanabe & Burton LLP (57) ABSTRACT

Nanocomposite compositions and methods for preparing nanocomposite compositions films are provided. The nanocomposite compositions include dendritic fibrous nanoparticles that have a diameter ranging from 50 to 500 nm, and a polymer matrix comprising poly(methyl methacrylate) (PMMA), where the dendritic fibrous nanoparticles have a hydrophobic coating and are dispersed within the PMMA matrix. Methods of preparing nanocomposite compositions may include introducing dendritic fibrous nanoparticles into a mixture with a poly(methyl methacrylate) and an organic solvent to form a composite solution. Methods further include casting the mixture onto a glass sheet within a mold, evaporating the organic solvent to form the nanocomposite film, and separating the nanocomposite film from the glass sheet.

20 Claims, 3 Drawing Sheets

(51) Int. Cl.

| | |
|---|---|
| B29C 39/10 | (2006.01) |
| B29C 39/36 | (2006.01) |
| C08F 2/06 | (2006.01) |
| C08K 7/10 | (2006.01) |
| C08F 20/14 | (2006.01) |
| B29K 33/00 | (2006.01) |
| B82Y 30/00 | (2011.01) |
| B82Y 40/00 | (2011.01) |
| C08K 3/36 | (2006.01) |
| C08K 3/22 | (2006.01) |

(52) U.S. Cl.
CPC ............... *C08F 20/14* (2013.01); *C08K 7/10* (2013.01); *C08L 33/12* (2013.01); *B29K 2033/12* (2013.01); *B82Y 30/00* (2013.01); *B82Y 40/00* (2013.01); *C08K 3/36* (2013.01); *C08K 2003/2241* (2013.01); *C08K 2003/2244* (2013.01); *C08K 2003/2296* (2013.01); *C08K 2201/003* (2013.01); *C08K 2201/011* (2013.01)

(58) Field of Classification Search
CPC .............. C08K 3/36; C08K 2003/2241; C08K 2003/2244; C08K 2003/2296
See application file for complete search history.

(56) References Cited

U.S. PATENT DOCUMENTS

| | | | |
|---|---|---|---|
| 2013/0209795 A1 | 8/2013 | Liu | |
| 2014/0349061 A1* | 11/2014 | Sikka | B29C 37/0032 428/98 |
| 2014/0373915 A1 | 12/2014 | Saito et al. | |
| 2015/0200319 A1 | 7/2015 | Miyamura et al. | |
| 2016/0088756 A1 | 3/2016 | Ramadas | |
| 2019/0265247 A1 | 8/2019 | Yu | |
| 2019/0302925 A1 | 10/2019 | Ogumi et al. | |

OTHER PUBLICATIONS

Pawar, Eshwar, "A Review Article on Acrylic PMMA"; IOSR Journal of Mechanical and Civil Engineering (IOSR-JMCE); vol. 13, Issue 2, Version I; pp. 1-4, Mar.-Apr. 2016 (4 pages).

Grand View Research, "Polycarbonate Market Size Worth $25.37 Billion by 2024"; Oct. 2016; <https://www.grandviewresearch.com/press-release/global-polycarbonate-market>; Accessed Feb. 13, 2020 (6 pages).

Vaia, Richard A. et al., "Polymer Nanocomposites with Prescribed Morphology: Going beyond Nanoparticle-Filled Polymers"; Chemistry of Materials; vol. 19, No. 11; pp. 2736-2751; Apr. 21, 2007 (16 pages).

Schadler, Linda S. et al., "Designed Interfaces in Polymer Nanocomposites: A Fundamental Viewpoint"; MRS Bulletin, vol. 32, Issue 4: Polymer Nanocomposites: pp. 335-340; Apr. 2007 (6 pages).

Mu, Bin et al., "Well-Defined Dendritic-Graft Copolymer Grafted Silica Nanoparticle by Consecutive Surface-Initiated Atom Transfer Radical Polymerizations"; Industrial & Engineering Chemistry Research; vol. 46, No. 10; pp. 3069-3072; Apr. 10, 2007 (4 pages).

Wang, Yulu et al., "Dendritic Silica Particles with Well-Dispersed Ag Nanoparticles for Robust Antireflective and Antibacterial Nanocoatings on Polymeric Glass"; ACS Sustainable Chemistry & Engineering; vol. 6, No. 11; pp. 14071-14081; Sep. 25, 2018 (11 pages).

Wang, Yabin et al., "Dendritic fibrous nano-particles (DFNPs): rising stars of mesoporous materials"; Journal of Materials Chemistry A; vol. 7, Issue 10; pp. 5111-5152; Jan. 7, 2019 (42 pages).

Chujo, Yoshiki et al., "Organic Polymer Hybrids with Silica Gel Formed by Means of the Sol-Gel Method"; Macromolecules: Synthesis, Order and Advanced Properties; Advances in Polymer Science, vol. 100; pp. 11-29; 1992 (19 pages).

Novak, Bruce M., "Hybrid Nanocomposite Materials-Between Inorganic Glasses and Organic Polymers"; Advanced Materials; vol. 5, Issue 6; pp. 422-433; Jun. 1993 (12 pages).

Kim, Hyunwoo et al., "Processing-property relationships of polycarbonate/graphene composites"; Polymer; vol. 50, Issue 15; pp. 3797-3809; Jul. 17, 2009 (13 pages).

Cai, Hualun et al., "Preparation and properties of polycarbonate/polyhedral oligomeric silsesquioxanes (POSS) hybrid composites"; Polymers Advanced Technologies; vol. 23, Issue 4; pp. 765-775; Apr. 25, 2011 (11 pages).

Motaung, T.E. et al., "The effect of silica nanoparticles on the morphology, mechanical properties and thermal degradation kinetics of polycarbonate"; Composites Science and Technology; vol. 73; pp. 34-39; Nov. 23, 2012 (6 pages).

Feng, Yuezhan et al., "Effects of modified silica on morphology, mechanical property, and thermostability of injection-molded polycarbonate/silica nanocomposites"; Journal of Reinforced Plastics and Composites; vol. 33, Issue 10; pp. 911-922; May 2014 (12 pages).

Han, Xiaohang et al., "Preparation and characterization of long chain branched polycarbonates with significantly enhanced environmental stress cracking behavior through gamma radiation with addition of difunctional monomer"; Polymer Chemistry; vol. 7, Issue 21; pp. 3551-3561; May 3, 2016 (11 pages).

Phua, Y. J. et al., "Injection Molded Short Glass and Carbon Fibers Reinforced Polycarbonate Hybrid Composites: Effects of Fiber Loading"; Journal of Reinforced Plastics and Composites; vol. 29, Issue 17; pp. 2592-2603; Sep. 2010 (12 pages).

Lee, Long-Hua et al., "High-Refractive-Index Thin Films Prepared from Trialkoxysilane-Capped Poly(methyl methacrylate)-Titania Materials"; Chemistry of Materials; vol. 13, Issue 3; pp. 1137-1142; Mar. 2001 (6 pages).

Rashahmadi, Samrand et al., "Improving the Mechanical Properties of Poly Methyl Methacrylate Nanocomposites for Dentistry Applications Reinforced with Different Nanoparticles"; Polymer-Plastics Technology and Engineering; vol. 56, Issue 16; pp. 1730-1740; Apr. 19, 2017 (11 pages).

Thomassin, Jean-Michel et al., "Poly(methyl methacrylate)/Graphene Oxide Nanocomposites by a Precipitation Polymerization Process and Their Dielectric and Rheological Characterization"; ACS Publications: Macromolecules; vol. 47, Issue 6; pp. 2149-2155; Mar. 14, 2014 (7 pages).

Mbese, Johannes Z. et al., "Preparation and Characterization of ZnS, CdS and HgS/Poly(methyl methacrylate) Nanocomposites"; MDPI Open Access Journals: Polymers; vol. 6, Issue 9; pp. 2332-2344; Sep. 5, 2014 (14 pages).

Zhao, Fan et al., "Nanoparticle decorated fibrous silica membranes exhibiting biomimetic superhydrophobicity and highly flexible properties"; RSC Advances; vol. 1; Issue 8; pp. 1482-1488; Oct. 21, 2011 (7 pages).

Ding, Bin et al., "Fabrication of a super-hydrophobic nanofibrous zinc oxide film surface by electrospinning"; Thin Solid Films; vol. 516, Issue 9; pp. 2495-2501; Mar. 3, 2018 (7 pages).

Dong, Zhengping et al., "Silver nanoparticles immobilized on fibrous nano-silica as highly efficient and recyclable heterogeneous catalyst for reduction of 4-nitrophenol and 2-nitroaniline"; Applied Catalysis B: Environmental; vols. 158-159; pp. 129-135; Oct. 2014 (7 pages).

Polshettiwar, Vivek et al., "High-Surface-Area Silica Nanospheres (KCC-1) with a Fibrous Morphology"; Angewandte Chemie International Edition; vol. 49, Issue 50; pp. 9652-9656; Dec. 10, 2010 (5 pages).

Fihri, Aziz et al., "Decorated fibrous silica epoxy coating exhibiting anti-corrosion properties"; Progress in Organic Coatings; vol. 127; pp. 110-116; Feb. 2019 (7 pages).

He, Huiwen et al., "High transparency and toughness PMMA nanocomposites toughened by self-assembled 3D loofah-like gel networks: fabrication, mechanism, and insight into the in situ polymerization process"; RSC Advances; vol. 6, Issue 41; pp. 34685-34691; Mar. 22, 2016 (7 pages).

Chen, Si et al., "High Toughness and Light Transmittance of PMMA Composite Prepared via In-Situ Polymerization with Incorporating Self-Assembled Dendritic Gel Networks"; Journal of Macromolecular (56) References Cited

OTHER PUBLICATIONS

Science, Part A: Pure and Applied Chemisty; vol. 51, Issue 2; pp. 173-179, Jan. 24, 2014 (7 pages).
Stojanović, Dušica B. et al., "Hybrid acrylic nanocomposites with excellent transparency and hardness/toughness balance"; Progress in Organic Coatings; vol. 139, Article 105437; pp. 1-8; Feb. 2020 (8 pages).
Marouf, Bahereh T. et al., "Toughening of Epoxy Nanocomposites: Nano and Hybrid Effects"; Polymer Reviews; vol. 56, Issue 1; pp. 70-112; Mar. 7, 2016 (43 pages).
Chantarachindawong, Rojcharin et al., "Development of the Scratch Resistance on Acrylic Sheet With Basic Colloidal Silica (SiO2)-Methyltrimethoxysilane (MTMS) Nanocomposite Films by Sol-Gel Technique"; The Canadian Journal of Chemical Engineering; vol. 90, Issue 4; pp. 888-896; Aug. 2012 (9 pages).

\* cited by examiner

FIG. 5

FIBROUS NANOPARTICLE-FILLED POLY (METHYL METHACRYLATE) COMPOSITES AND METHODS OF FABRICATION

BACKGROUND

Polymeric composite materials have been studied for use in a variety of applications resulting from a combination of properties that cannot be attained by metals, ceramics or polymers alone. Polycarbonate (PC) and poly(methyl methacrylate) (PMMA) have been broadly investigated as polymers for applied and fundamental research. PMMA has been used as an alternative to PC when tensile strength, flexural strength, transparency, polishability, and ultraviolet (UV) tolerance are significant properties in the resulting product. The optical clarity of these two polymers is relative to other common thermoplastics. For this reason, these two polymers have been exploited in several applications, including electronic appliances, automobile, safety equipment, architecture and aerospace, such as aircraft components. However, certain properties of the resulting PMMA or PC composites, such as brittleness and reduced scratch resistance, limit their ultimate application and use.

Numerous studies have focused on improving the properties of transparent polymers using fillers and reinforcements to expand and diversify their applications without affecting their transparency.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed relate to a nanocomposite composition that includes dendritic fibrous nanoparticles. The nanocomposite composition may include dendritic fibrous nanoparticles that have a diameter ranging from 50 to 500 nm (nanometers), and a polymer matrix comprising poly(methyl methacrylate) (PMMA). The nanocomposite composition may include the dendritic fibrous nanoparticles and they may be dispersed within the polymer matrix. The nanocomposite composition may further include dendritic fibrous nanoparticles that have a hydrophobic coating and are dispersed within the polymer matrix.

In a further aspect, embodiments disclosed relate to methods for preparing a nanocomposite film that includes functionalizing dendritic fibrous nanoparticles with a hydrophobic coating. The method may include dendritic fibrous nanoparticles that have a diameter ranging from 50 to 500 nm. The method may further include introducing a poly (methyl methacrylate) powder to a mixture of the dendritic fibrous nanoparticles and an organic solvent to form a composite solution. The method includes casting the mixture onto a glass sheet within a mold, evaporating the organic solvent to form the nanocomposite film, and separating the nanocomposite film from the glass sheet.

In another aspect, embodiments disclosed relate to methods for preparing a nanocomposite where the method includes functionalizing dendritic fibrous nanoparticles with a hydrophobic coating having a diameter ranging from 50 to 500 nm. The method may include steps of introducing the dendritic fibrous nanoparticles to a liquid solution of methyl methacrylate (MM) monomer and polymerizing the MM monomer in-situ to form a PMMA matrix with the dendritic fibrous nanoparticles dispersed within the PMMA matrix.

Other aspects and advantages of the disclosure will be apparent from the following description and the appended claims.

DETAILED DESCRIPTION

Embodiments of the present disclosure are directed to nanocomposite compositions that contain a polymer matrix and dendritic fibrous nanoparticle (DFN) additives that may be used to improve the properties, including, but not limited to, scratch resistance and impact resistance, of the primary polymer matrix of the composition and articles thereof.

The nanocomposite composition may include a matrix polymer of a thermoplastic transparent polymer and a plurality of DFNs dispersed in the polymer matrix, where the plurality of DFNs may be modified with a coating to improve dispersion of the particles within the polymer matrix, without limiting or adversely affecting the mechanical properties of the base polymer matrix. For example, nanocomposite compositions in accordance with the present disclosure may exhibit improvements in scratch resistance and impact resistance while also maintaining a balance of mechanical and optical properties provided by the base polymer matrix.

In one or more embodiments, nanocomposite compositions may be blended with a DFNs to adjust various physical and chemical properties of the final composition. Specifically, in one or more embodiments, physical and chemical properties of a base matrix polymer may be modified by blending with modified DFNs. The modified DFNs have been functionalized with a hydrophobic coating. In some embodiments, the functionalized DFNs may be added as a scratch resistance improving agent. Processes of manufacturing nanocomposite compositions in accordance with the present disclosure may include various methods, such as solution casting or compounding/extrusion. PMMA-based hybrid materials can be applicable to electronic devices, high refractive index materials, electroluminescent materials, solar cells, and thin film transistors.

Base-Polymer Matrix

Nanocomposite compositions in accordance with the present disclosure may include a matrix polymer component that surrounds other components in the composition, including DFNs and other additives.

One or more embodiments of the present disclosure relates to nanocomposite compositions containing a thermoplastic base-polymer matrix in which DFNs may be dispersed. The thermoplastic polymer matrix may be characterized as a transparent thermoplastic polymer, such as PMMA, polycarbonate, or a combination thereof. In one or more embodiments, the thermoplastic polymer matrix be comprised of a transparent non-polar polymer such as PMMA.

In one or more embodiments, polymer compositions may contain a percent by weight of the total composition (wt %) of matrix polymer ranging from a lower limit of 95 to and upper limit of 99.9 wt %. For example, the nanocomposite composition may contain PMMA in an amount ranging from a lower limit selected from one of 95, 96, 97, 97.5, 98, 98.2, 98.5, 98.8, 99, and 99.2 wt % to an upper limit selected from one of 97, 97.5, 98, 98.2, 98.5, 98.8, 99, 99.2, 99.5, 99.7 and 99.9 wt %, where any lower limit can be used in combination with any mathematically feasible upper limit.

The nanocomposite composition according to the present disclosure may include a poly(methyl methacrylate) (PMMA) polymer, which may be a homopolymer or copolymer. The PMMA polymer or copolymer may have a weight average molecular weight of at least 3,0000 grams per mole. In some embodiments, the PMMA polymer or copolymer may have a weight average molecular weight of at least 15,000 grams per mole, 100,000 grams per mole, 120,000 grams per mole, 150,000 grams per mole, 200,000 grams per mole, 215,000 grams per mole, or 250,000 grams per mole. The PMMA polymer or copolymer may have a weight average molecular weight of up to 330,000 grams per mole, in some embodiments, up to 350,000 grams per mole, and in some embodiments, up to 400,000 grams per mole. It should generally be understood that the PMMA polymer or copolymer is a linear polymer or copolymer.

In one or more embodiments, the PMMA polymer may be a copolymer that includes comonomers. In one or more embodiments the comonomer may include acrylates, such as n-butyl-acrylate, ethyl acrylate, 2-ethylhexyl acrylate; methacrylates, such as ethyl methacrylate, butyl methacrylate; acrylic acids and methacrylic acids, and their salts; fluorinated acrylics; styrene, acrylamide; acrylonitrile; and combinations thereof.

Dendritic Fibrous Nanoparticles

Embodiments in accordance with the present disclosure generally relate to compositions and methods including DFNs dispersed within a polymer matrix. One or more embodiments may include DFNs functionalized with a hydrophobic coating to improve the dispersion of the DFNs within the polymer matrix.

One or more embodiments of the present disclosure may relate to compositions and methods that include DFNs. In one or more embodiments, the DFNs may include, but are not limited to metals, metal oxides, and metalloids, such as silica, titanium oxide, zinc oxide, and zirconium oxide, or combinations thereof. In one or more embodiments, the DFNs may be dendritic fibrous silica nanoparticles.

The dendritic fibrous nanoparticles may be prepared by hydrothermal, sol-gel, electrospinning, hydrothermal microwave assisted techniques, or any other technique known to one skilled in the art.

Figure 1:
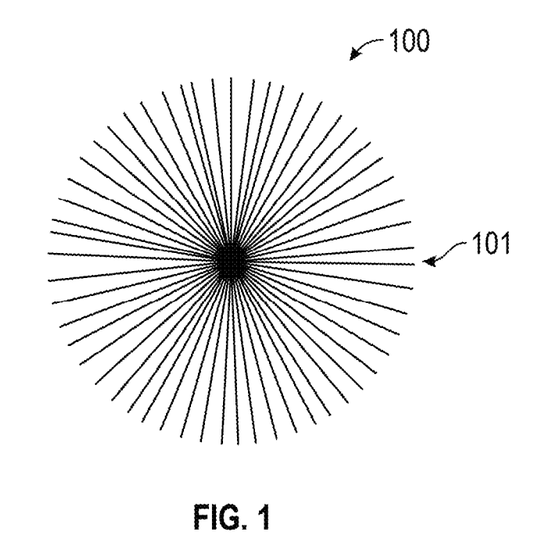
FIG. 1 is a representation of a dendritic fibrous nanoparticle (DFN) prepared in accordance with one or more embodiments of the present disclosure.

In one or more embodiments, the DFNs may have a structure that is generally spherical. A singular DFN includes a plurality of fibers that are radially oriented within the DFN. As shown in FIG. 1, the morphology of DFNs 100 is further characterized by the manner in which the fibers 101 radiate out from a core in a flower-like or beaded fiber formation. The microstructure of the DFN includes a high degree of porosity generated by the space between the radiating dendritic fibers. DFNs are characterized by their unique fibrous morphology, large radial pores and dendritic pore networks. They provide spacious pore volume, a large surface area and a greater number of active sites for further reaction. DFNs are further characterized by their physical properties, including a high surface area which is provides by the extended network of fibrous material, excellent thermal and hydrothermal stabilities, and high mechanical stability.

In one or more embodiments, the morphology of the DFNs may vary based on the chemical composition of the particle. The morphology may include shapes, such as a flower-type shape or a spherical shape having rods extending from the spherical core. The surface area of the nanoparticles may also vary depending on the morphology of the DFN. The exact dimensions of the DFN may vary depending on the morphology.

Figure 2:
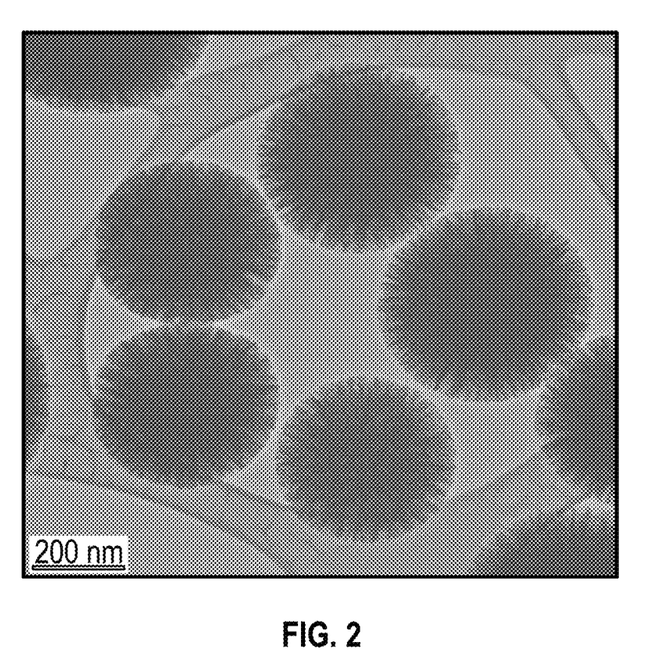
FIG. 2 shows TEM images of several DFNs and scale bar for reference.

The physical properties of the DFNs, such as their increased surface area, dimension, and morphology, can yield changes in the achievable properties of composites. The transparency of the resulting nanocomposite composition and film may be dependent on the size of the incorporated DFNs. For example, nanocomposite films comprising larger DFNs incorporated within the polymer matrices may be shown to have reduced transparency relative to films with smaller diameter DFNs, or films prepared without DFNs. In one or more embodiments, the diameter of the DFNs may range from about 50 nm (nanometers) to about 500 nm, as determined by transmission electron microscopy (TEM), as shown in FIG. 2. For example, in one or more embodiments, the nanocomposite composition may contain DFNs with a particle diameter ranging from a lower limit of 50, 75, 100, 125, 150, 200, 250, and 300 nm to an upper limit of 100, 150, 200, 250, 300, 350, 400, 450, and 500 nm, where any lower limit can be used in combination with any mathematically feasible upper limit.

In one or more embodiments, nanocomposite compositions may contain DFNs in an amount of the range of 0.1 to 5 wt %. For example, the nanocomposite composition may contain the DFNs in an amount ranging from a lower limit of 0.1, 0.3, 0.5, 0.8, 1, 1.2, 1.5, 1.8, 2, 2.5, and 3 wt % to an upper limit of any of 0.8, 1, 1.2, 1.5, 1.8, 2, 2.5, 3, 4, and 5 wt %, where any lower limit can be used in combination with any mathematically feasible upper limit.

Functionalizing Particles

In one or more embodiments, DFNs may be modified via surface functionalization. In one or more embodiments, DFNs may be modified with a hydrophobic ligand that is bound to the surface of the DFN. The ligand may be bound to the surface of the DFNs in a manner that provides a complete or partial coating on the surface of the DFNs. The surface modification of the DFNs can be accomplished, for example, by treating the nanoparticle solution with a ligand containing solution. For example, the ligand may be an organic molecule, including a silane linker grouper capable of forming a self-assembled monolayer on the surface of the DFNs. After treating the nanoparticle solution with a ligand containing solution, the presence of the ligand at the surface of the DFNs was confirmed by a combination of techniques, including Fourier transform infrared spectroscopy (FTIR) and thermogravimetric analysis.

In one or more embodiments, the surface modification of the DFNs may be accomplished to provide a hydrophobic coating or layer. Without being bound by any particularly theory, the resulting hydrophobic coating can reduce the agglomeration of the DFNs in a polymer matrix. In one or more embodiments, a silane molecule that further include a terminal or tail group may be suitable for providing a hydrophobic character to the DFNs. For example, the organosilane ligand may be an alkyl organosilane comprising between 4 and 20 carbons.

Figure 3:
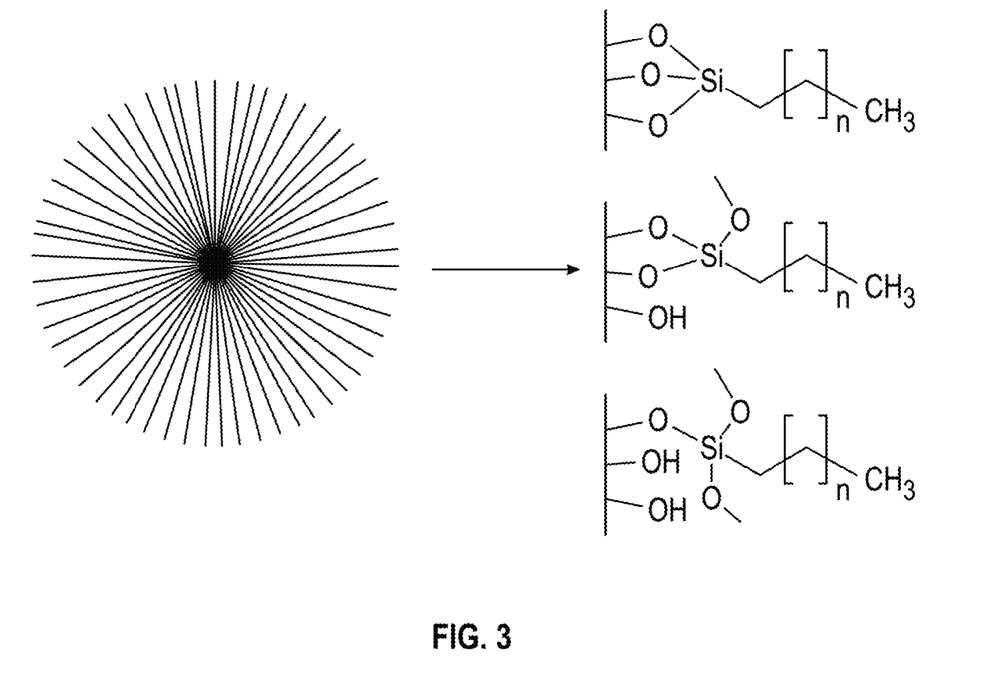
FIG. 3 is a representation of the modification of a singular DFN with an alkyl organosilane.

The nature of the particles can be tuned through the described silanization processes to functionalize the DFNs. DFNs may be reacted with, and subsequently coated by, alkyl terminated organosilanes with different alkoxy-, dialkoxy, trialkoxy, and trichloro derivatives, that serve to link the DFNs to the ligand molecules. This reaction may be conducted in toluene, bicyclohexane, or any common non-polar organic solvent that may be conventionally used. The reaction can include functionalization via reaction of the DFNs with n-alkyltrichlorosilanes, such as n-octadecyltrichlorosilane, octyltrichlorosilane, dodecyltrichlorosilane, and decyltrichlorosilane, as generally depicted in FIG. 3. This hydrophobic coating technique may provide for improved dispersity and reduced reactivity of the DFNs in the polymer matrix, and may prevent the DFNs from agglomerating within the composition. The linker can be used in the form of a diluted solution prepared by using such a solvent. As for the linker concentration, any appropriate concentration can be used. For example, a linker solution having a concentration of 0.001% to 20.0% by volume (v/v %), relative to the volume of the solvent, may be added to the solution for preparing the hydrophobic DFNs.

Additives

Nanocomposite compositions in accordance with the present disclosure may optionally further comprise one or more additives that can modify various physical and chemical properties of the composition. Such additives may be selected from, for example, flow lubricants, antistatic agents, clarifying agents, nucleating agents, beta-nucleating agents, slippage agents, antioxidants, antacids, light stabilizers, infrared (IR) absorbers, UV absorbers, plasticizers, impact modifiers, anti-hydrolysis additives, organic dyes, organic pigments, inorganic dyes, inorganic pigments, and combinations thereof. One of ordinary skill in the art will appreciate that the choice of additive may be dependent upon the intended use of the composition and articles produced therefrom. It will also be appreciated that such additives are not limited to those described.

In one or more embodiments, nanocomposite compositions may contain a percent by weight of the total composition (wt %) of one or more additives ranging from a lower limit selected from one of 0.001 wt %, 0.01 wt %, 0.05 wt %, 0.5 wt %, and 1 wt %, to an upper limit selected from one of 1.5 wt %, 2 wt %, 5 wt %, and 7 wt %, where any lower limit can be used with any upper limit.

Nanocomposite compositions in accordance with embodiments of the present disclosure will generally possess physical properties suitable for the intended use of the composition and the articles produced therefrom. One of ordinary skill in the art, with the benefit of this present disclosure, will appreciate that altering the relative amounts and identities of the components of a polymer composition will influence the resulting properties of the composition.

Method for Preparing Nanocomposite Compositions

Nanocomposite compositions in accordance with the present disclosure may be prepared by a number of possible blending and formulation techniques, which will be discussed in the following sections. In particular, as described, DFNs may be combined with a base-polymer component; where combining the DFNs with the base-polymer composition improves the scratch resistance and impact resistance of the polymer composition with respect to the base-polymer composition alone.

Figure 4:
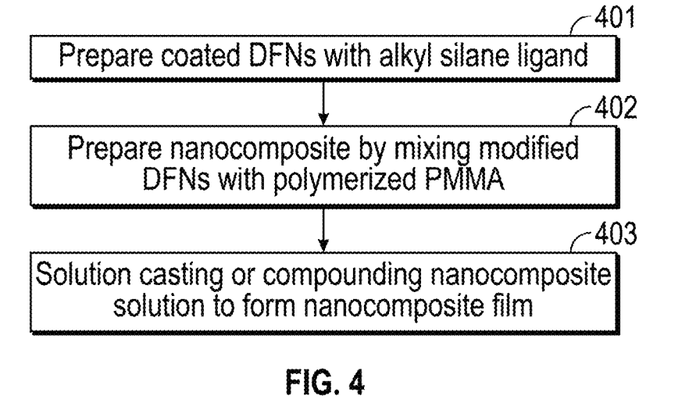
FIG. 4 is a schematic representation of a method of producing PMMA and DFNs nanocomposites via solution casting of a mixture of the two components.

In one or more embodiments, nanocomposite materials may be prepared by direct mixing of the thermoplastic polymer and DFNs, either in solution by using solvents (that is, solvent mixing method) or in the absence of solvents (for example, melt-compounding methods). Conventionally, these two processes could lead to aggregation of nanoparticles that could significantly reduce the mechanical and optical properties of the resulting transparent composite films. However, the present embodiments relate to the use of new methods and additive compositions to prepare transparent DFN-filled polymer nanocomposites. In some embodiments, the particles may be added to a preformed PMMA as shown in FIG. 4. The DFNs may be prepared in accordance with one or more embodiments of this disclosure. For example, 401 DFNs may be modified with hydrophobic coating. The nanocomposite may be prepared by 402 forming a polymer matrix by directly mixing the DFNs with pre-formed PMMA in 403 solution or by compound processing techniques using solution casting or extruders to form a film. These processes can provide several advantages including high through-put and reduction in environmental impact. By modifying the surface of the porous DFNs with a hydrophobic coating, aggregation and reactivity of the DFNs within the polymer matrix may be reduced.

The nanocomposites can then be prepared by dissolving and mixing the solution containing both the PMMA and the hydrophobic DFNs constituents and drying the resulting mixture, or by melt-compound extrusion of the thermoplastic polymer and the DFNs to form a mixture, as detailed in the following paragraphs. The specific choice of methods will be specific to the resulting application of the material.

Figure 5:
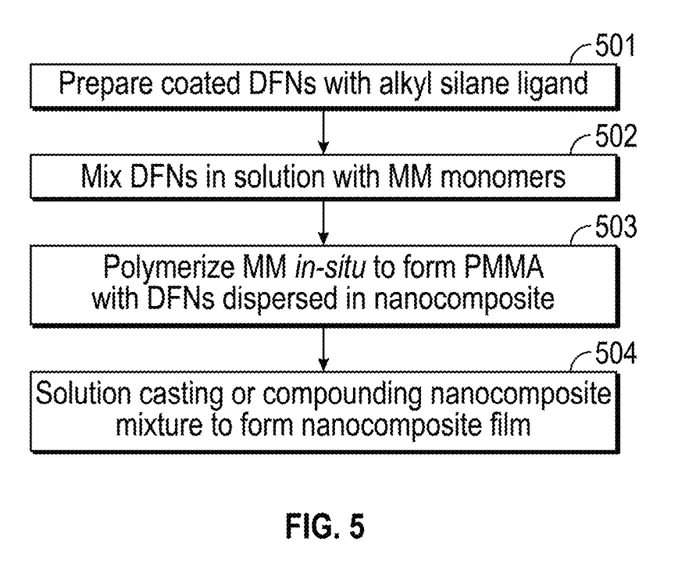
FIG. 5 is a schematic representation of a method of producing PMMA and DFNs nanocomposites via in-situ polymerization of methyl methacrylate in solution in the presence of DFNs.

Another method for preparing the nanocomposite compositions includes synthesizing the DFN-polymer nanocomposites in-situ via polymerization of monomers in presence of pre-formed DFNs, as shown in FIG. 5. For example, 501 DFNs may be modified with a hydrophobic ligand and 502 mixed with methyl methacrylate monomer (MM) prior to polymerization to form a solution of MM comprising dispersed DFNs. The MM may then be 503 polymerized in-situ with the filler present to form a PMMA matrix with well dispersed DFNs. In such a method, the nanofiller can be mixed with a liquid MM monomer, which can then be polymerized to form the nanocomposite. The polymerization processes of methods in accordance with one or more embodiments are not particularly limited. However, in one or more embodiments, the polymerization process may be accomplished via in-situ polymerization. The nanocomposite mixture may be formed into a film via 504 solution film casting or compounding techniques. In one or more embodiments, the polymerization reaction may further include a polymerization initiator. Polymerization initiators of one or more embodiments may include azo compounds such as azobisisobutyronitrile (AIBN), organic peroxides, such as benzoyl peroxide, and inorganic peroxides, such as sodium persulfate, or combinations thereof.

Processes may also include mixing and stirring to improve the dispersion of the DFNs in solution. Mixing can be assisted using various additives, such as dispersants, surfactants, binders, modifiers, and additives. One or more additives may also be added to enhance one or more of the properties of the filler-matrix composite.

The resulting nanocomposite composition may be produced in the form of a film or substrate depending upon its ultimate use or application. In one or more embodiments, the nanocomposite composition may have improved scratch resistance relative to a film produced without the DFNs additive.

The resulting nanocomposite composition may be produced in the form of a film or substrate depending upon its ultimate use or application. In one or more embodiments, the nanocomposite composition may have transmittance value that is not diminished relative to the transmittance value of a film comprising only the base polymer.

The nanocomposite compositions may be prepared in any known process for film and substrate formulation, such as in-situ polymerization, solution casting, blending, and compounding.

In one or more embodiments, solutions of the preformed PMMA and DFNs may be prepared, mixed with solvents, and coated onto a carrier substrate, such as glass. The preparation of the mixed PMMA and DFNs may include preformed PMMA that may be ground or milled prior to be mixed with DFNs. The mixture of ground PMMA and DFNs may be stirred and sonicated to homogenize the mixture to further ensure that the DFNs are adequately dispersed throughout the PMMA matrix. The mixture may then be coated onto a carrier substrate, such as glass. The resulting film can then dried and stripped from the carrier substrate to produce the resulting nanocomposite film. This process provides for simplified methods of incorporation of the DFNs within the PMMA matrix to form the produced film. Additionally, solution casting may provide greater film thickness, uniformity, and a reduced degree of film defects.

In some embodiments, films may be prepared from methyl methacrylate (MM) monomer that may be polymerized in-situ in the presence of DFNs in solution. The polymerization may be a bulk or solution process. In one or more embodiments, the present disclosure relates to a method for producing nanocomposite polymer films comprising DFNs dispersed in solution cast polymer films prepared from MM monomers that are polymerized in-situ and with DFNs dispersed within the resulting polymerized PMMA matrix.

In some embodiments, the nanocomposite can be formed into a film using conventional filmmaking techniques, such as melt compounding and extrusion of the nanocomposite composition, to a produce a film of DFNs dispersed in PMMA. In one or more embodiments, films of the nanocomposite compositions may be prepared using continuous or discontinuous extrusion. In some embodiments, raw materials can be added to an extruder, simultaneously or sequentially, into the main or secondary feeders in the form of powder, granules, flakes or dispersion in liquids as solutions, emulsions and suspensions of one or more components to produce the extruded films.

In one or more embodiments, methods of preparing the nanocomposite composition may involve a single extrusion or multiple extrusions following the sequences of the blend preparation stages. The polymer and DFN components can be pre-dispersed in prior processes using mixers. In one or more embodiments, the polymerization process may comprise the use of any suitable apparatus or equipment that is known in the art.

PMMA-based hybrid materials and films may be applicable to electronic devices, high refractive index materials, electroluminescent materials, solar cells, and thin film transistors.

In solar cells, the challenge of the development of power generation lies in how to improve the existing manufacturing process and the design and preparation of relevant materials for solar cells and modules. For example, the incoming sunlight from the front glass sheet passes through the glass sheet to reach the solar cell sheet where it is converted to electric energy. The transmittance, scratch resistance, and impact resistance of the glass sheet is critical to ensure sufficient incident light can reach the cell sheet.

The nanocomposite film prepared in accordance with one or more embodiments of the present disclosure can be formed via film forming processes, such as solution casting, and extrusion, and also can be formed via co-extrusion in the preparation of the nanocomposite sheet. The nanocomposite film according to the present disclosure may have a thickness of from about 0.1 millimeters (mm) to about 10 mm. In one or more embodiments, the nanocomposite film may have a thickness of from about 0.1, 0.5, 1.0, 1.5, 2.0, 2.5, and 3.0 millimeters (mm) to about 2.5, 3.0, 3.5, 4, 6, 8, and 10 mm, where any lower limit may be combined with any mathematically feasible upper limit. The nanocomposite compositions of the present disclosure are prepared to include transparent robust films of DFNs in a PMMA polymer matrix to provide a front cell sheet with high transparency and improved scratch resistance without diminishing the mechanical properties of the PMMA polymer matrix.

EXAMPLES

The following examples are illustrative and should not be interpreted as limiting the scope of the present disclosure.

In the following examples, a number of polymer samples are analyzed to demonstrate the changes in properties associated with polymer compositions prepared in accordance with the present disclosure.

Sample 1: Preparation of Dendritic Fibrous Silica Particles

Dendritic fibrous silica particles were successfully prepared by hydrothermal process. A solution composed of tetraethoxysilane (20 grams) (g), cyclohexane (240 mL) and 1-pentanol (12 milliliters) (mL) was prepared and stirred for 30 min. Concurrently, an additional solution including cetyltrimethylammonium bromide (8 g), urea (4.8 g), and deionized water (240 mL) was mixed and stirred for 30 minutes (min). The tetraethoxysilane solution was then added into the cetyltrimethylammonium bromide solution and stirred for 1 hour (h). The solution was then transferred into an autoclave and heated in an oven at 125° C. for 6 h. The autoclave was then gradually cooled and the silica particles were collected by repeated centrifugation in deionized water and ethanol. After being dried overnight at room temperature, the synthesized DFNs were calcined under continuous air flow at 550° C. for 4 h yielding a pure white powder. The formed DFNs were further characterized by TEM and determined to have an average diameter ranging from 380 to 460 nm.

Sample 2: Modification of DFNs

Silica DFNs were modified with a hexadecyl-trimethoxysilane coating to impart hydrophobic character to the DFNs. The silica DFNs were dried for about an 1 h at 100° C. and then immediately moved into a round-bottom flask. A solution of about 17% by volume by volume (v/v %) of hexadecyl-trimethoxysilane in toluene was prepared and added to the flask. The resulting mixture was refluxed for about 2 days. The suspension was cooled and solid product was isolated from the solution by repeated centrifugation using polar and non-polar solvents. The silica DFNs powder was dried ground to a fine powder.

Sample 3: Preparation of PMMA Films with DFNs

To prepare PMMA/dendritic fibrous silica (1 wt %), a sheet of plexiglass was broken down into small pieces and milled in a cryogenic mill to produce fine polymethylmethacrylate powder. To make PMMA samples with 1 wt % silica, 0.04 g of modified dendritic fibrous silica particles with hexadecyltrimethoxysilane was dispersed in 80 ml of chloroform. The mixture was then sonicated for 3 hours to ensure a good dispersion of silica in the solvent. Following sonication, 4 g of PMMA powder was slowly added to the mixture and stirred until fully dissolved. Subsequently, the mixture was poured into a Teflon™ mold with a sheet of glass clamped to the base.

The mold was then placed into a large glass container with a narrow opening at the top to allow the solvent to evaporate over the course of about three days. Then, the opening was widened to increase the evaporation rate, allowing the solvent evaporate more quickly over the following two days. The mold supporting the glass sheet and attached PMMA film was then removed from the container. The glass substrate was separated from the Teflon mold and left until the PMMA separated from the glass after about 24 hours.

After acquiring the PMMA films, a spectrophotometer, utilizing a xenon lamp as a light source, was used to measure transmittance of the prepared nanocomposite film comprising DFNs dispersed within the PMMA matrix. First, a small section was cut out of an area of the sample and mounted on a custom sample holder. Next, a transmittance scan was conducted using the Fluoracle® software with a wavelength range of 450 nm to 700 nm. A background scan was conducted and compared with the previous transmittance scan to produce the transmittance data for the sample. For a nanocomposite comprising 1 wt % DFNs in a polymer matrix, the measured transmittance value was 53%.

Comparative Example

A comparative Example of PMMA was prepared as described above, only without the addition of the DFNs. The PMMA film was tested as described above, with a spectrometer, to measure the transmittance of the prepared PMMA film without the DFNs.

Transmittance of PMMA film without DFNs was measured to be 90.46%. Such results demonstrate that while transmittance may decrease with the addition of the DFNs, the additions of DFNs improve the impact resistance and scratch resistance of the resulting PMMA films.

Scratch Testing

Scratch test of the prepared samples was conducted using pencil scratch tester according to ASTM D3363-05 with a load of 500 g, pencil angle of 45° and a scratch speed of 1 mm/s. In this test, a set of calibrated wood pencils are employed to determine the film hardness on a scale of 6B-5B-4B-3B-2B-B-HB-F-H-2H-3H-4H-5H-5H where 6B is the softest and 6H is the hardest in terms of sample film hardness.

Scratch testing included a first sample of the Comparative Example comprising only PMMA that was tested according to the above described method. The film comprising only PMMA was shown to have a scratch value of 5B. In comparison, the nanocomposite film comprising about 1% fibrous silica functionalized with trimethoxy(octyl)silane, which was prepared as described in Sample 3, showed a significant increase in scratch resistance corresponding to a pencil hardness value of H.

Although the preceding description has been described with reference to particular means, materials and embodiments, it is not intended to be limited to the particulars disclosed; rather, it extends to all functionally equivalent structures, methods and uses, such as those within the scope of the appended claims.

The presently disclosed systems, apparatuses, methods, processes and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

The invention claimed is:

1. A nanocomposite composition comprising:
   dendritic fibrous nanoparticles, wherein the dendritic fibrous nanoparticles have a diameter ranging from 50 to 500 nm; and
   a polymer matrix comprising poly(methyl methacrylate) (PMMA), wherein the dendritic fibrous nanoparticles are dispersed within the polymer matrix;
   wherein the dendritic fibrous nanoparticles have a hydrophobic coating and are dispersed within the polymer matrix.

2. The nanocomposite composition of claim 1, wherein the dendritic fibrous nanoparticles are comprised of one or more selected from the group consisting of silica, titanium oxide, zinc oxide, zirconium oxide, or combinations thereof.

3. The nanocomposite composition of claim 1, wherein the hydrophobic coating comprises an organosilane.

4. The nanocomposite composition of claim 3, wherein the organosilane comprises an alkyl organosilane comprising between 4 and 20 carbons.

5. The nanocomposite composition of claim 1, wherein the nanocomposite composition includes the dendritic fibrous nanoparticles in an amount ranging from 0.1 to 5.0% by weight (wt %).

6. The nanocomposite composition of claim 1, wherein the nanocomposite composition comprises PMMA in an amount ranging from 95 to 99.9 wt %.

7. A method for preparing a nanocomposite film comprising:
   functionalizing dendritic fibrous nanoparticles with a hydrophobic coating, wherein the dendritic fibrous nanoparticles have a diameter ranging from 50 to 500 nm;
   introducing a poly(methyl methacrylate) (PMMA) powder to a mixture of the dendritic fibrous nanoparticles and an organic solvent to form a composite solution;

casting the mixture onto a glass sheet within a mold;
evaporating the organic solvent to form the nanocomposite film; and
separating the nanocomposite film from the glass sheet.

8. The method of claim 7, wherein the dendritic fibrous nanoparticles are comprised of one or more selected from the group consisting of silica, titanium oxide, zinc oxide, zirconium oxide, or combinations thereof.

9. The method of claim 7, wherein the hydrophobic coating comprises an organosilane.

10. The method of claim 9, wherein the organosilane comprises an alkyl organosilane comprising between 4 and 20 carbons.

11. The method of claim 7, wherein the nanocomposite film includes the dendritic fibrous nanoparticles in an amount ranging from 0.1 to 5.0% by weight (wt %).

12. The method of claim 7, wherein the nanocomposite film comprises PMMA in an amount ranging from 95 to 99.9 wt %.

13. The method of claim 7, wherein the film has a thickness ranging from 0.1 millimeters (mm) to 5 mm.

14. The method of claim 7, wherein the mixture of the PMMA powder and the functionalized DFNs is sonicated before casting the mixture onto a glass sheet.

15. A method for preparing a nanocomposite comprising:
functionalizing dendritic fibrous nanoparticles with a hydrophobic coating, wherein the dendritic fibrous nanoparticles have a diameter ranging from 50 to 500 nm;
introducing the dendritic fibrous nanoparticles to a liquid solution of methyl methacrylate (MM) monomer; and
polymerizing the MM monomer in-situ to form a PMMA matrix with the dendritic fibrous nanoparticles dispersed within the PMMA matrix.

16. The method of claim 15, wherein the dendritic fibrous nanoparticles are comprised of one or more selected from the group consisting of silica, titanium oxide, zinc oxide, zirconium oxide, or combinations thereof.

17. The method of claim 15, wherein the hydrophobic coating comprises an organosilane.

18. The method of claim 17, wherein the organosilane comprises an alkyl organosilane comprising between 4 and 20 carbons.

19. The method of claim 15, wherein the nanocomposite includes the dendritic fibrous nanoparticles in an amount ranging from 0.1 to 5.0% by weight (wt %).

20. The method of claim 15, wherein the nanocomposite composition comprises PMMA in an amount ranging from 95 to 99.9 wt %.

* * * * *